UNITED STATES PATENT OFFICE.

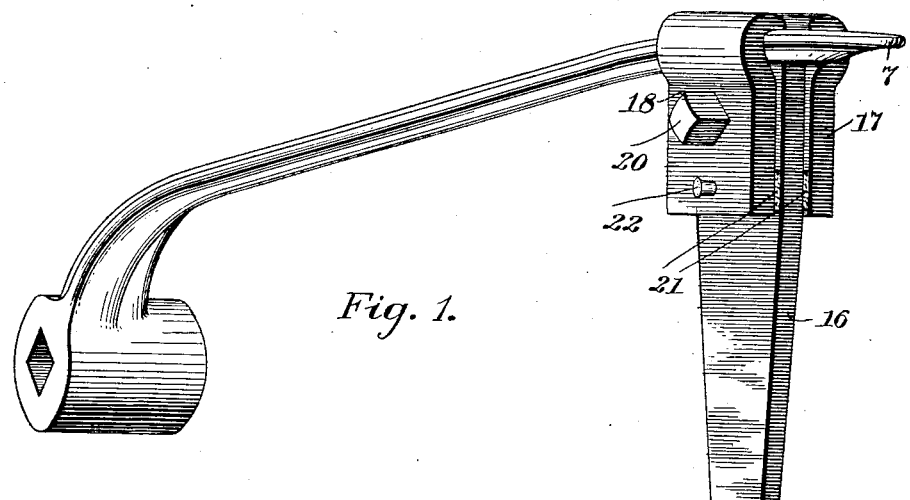
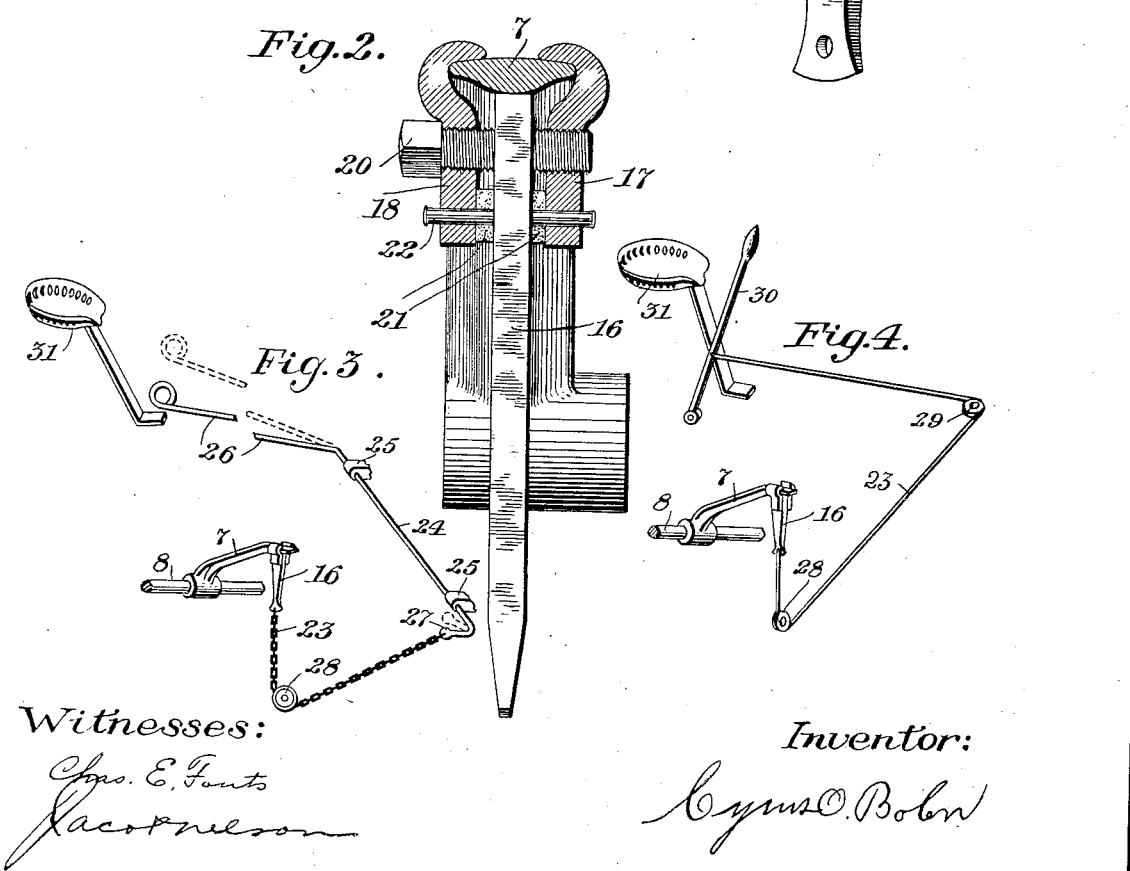

CYRUS O. BOLEN, OF UPHAM, NORTH DAKOTA.

TRIP DEVICE FOR HARVESTING-MACHINES.

1,039,690. Specification of Letters Patent. Patented Oct. 1, 1912.

Application filed October 18, 1909. Serial No. 523,280.

*To all whom it may concern:*

Be it known that I, CYRUS O. BOLEN, a citizen of the United States, residing in the village of Upham, in the county of McHenry and State of North Dakota, have invented certain new and useful Improvements in Trip Devices for Harvesting-Machines, of which the following is a specification.

My invention relates to harvesting machines, and particularly to the trip mechanism for bringing into operation the sheaf discharging devices.

Harvesting machines in common use are provided with automatic tripping mechanism which causes the discharge of the severed stalks when sufficient have been collected to form a sheaf of predetermined size. This trip mechanism is usually operated by the pressure of the collection of severed stalks on an arm or lever known as the trip lever, projecting in the path of the severed stalks as they are pressed toward the discharge point by the packers. In harvesting grain or stalks which may be of heavy or luxuriant growth, or in harvesting wet or tangled growths much difficulty is experienced through the fact that the severed stalks will clog or choke the machine and their movement will be arrested before they engage the trip lever, or they may resist the packers to such extent that they will not bear upon the trip lever with sufficient pressure to operate the discharge mechanism at the desired time. In such case it is necessary for the operator to leave his seat and clear the machine by removing the severed stalks by hand, or by manually tripping the trip lever, in either case endangering the arms of the operator and causing great inconvenience and loss of time. In some cases a stick is used to reach into the machine to operate the trip lever which may result in breakage or injury to the machine by the stick being caught in the operating parts. To overcome such difficulty and to provide means convenient to the operator which may be safely employed for tripping the discharge mechanism without the necessity of the operator leaving his seat and which may be employed at the will of the operator independent of the automatic operating devices, is one of the primary objects of the invention.

A further object of the invention is to provide a simple, cheap and efficient device which may be readily applied to existing harvesters and which may be removed therefrom when not needed, and which will in no way interfere with the automatic operation of the parts and which will be unlikely to get out of repair.

With the above primary and other incidental objects in view as will more fully appear in the specification, the invention consists of the features of construction, the parts and combinations thereof, and the mode of operation or their equivalents, as hereinafter described and set forth in the claims.

Referring to the drawings Figure 1 is a perspective view of the trip lever with the connecting device of the operating attachment secured in place thereon. Fig. 2 is an end elevation of same, partly in section. Fig. 3 and Fig. 4 illustrate two forms of control connections.

Like parts are indicated by similar characters of reference throughout the several views.

In the drawings, 7 is the trip lever, the depression of which causes the operative engagement of the actuating parts with the discharge mechanism with the machine. In harvesting machines as usually constructed the trip lever 7 projects above the plane of the binding deck and into the path of the severed stalks. Under normal conditions it is the pressure of the severed stalks upon the trip lever 7 projecting in their path as they are advanced by the action of the packer arms, which causes the depression of the trip lever and thereby the operation of the tying and discharge mechanism.

To provide for manual operation of the mechanism under abnormal conditions, such as wet or tangled grain, or heavy luxuriant growths, the following means is provided.

Secured upon the trip lever 7 in a pendant position is a bar 16 preferably squared at its upper end or so shaped as to abut the under side of the trip lever 7. Located on each side of the bar 16 are hook shaped clamp plates 17 and 18 which engage the opposite edges of the trip lever 7. The said parts are secured in place by a bolt or screw threaded stud passing through the clamping plates and the intermediate bar 16. In case a stud is employed as shown at 20 in Fig. 2, the clamp plate 17 and the bar 16 are provided with openings devoid of screw threads, while the opposite clamping plate 18 is provided with a screw threaded opening engaged by the threaded stud 20 to secure the said parts in position.

Located on each side of the bar 16, intermediate the bar and the clamping plates 17 and 18 are spreaders or washers 21, preferably of leather, to compensate for different widths of trip levers 7 to which it may be attached. The clamping plates 17 and 18, the spreaders 21 and the bar 16 are held in their proper relation by a transverse pin 22 preferably headed or riveted at each end to prevent the separation of the parts. The pin 22 is of somewhat greater length than the combined thickness of the clamping plates, the spreaders and the bar, as shown in Fig. 2, thereby permitting some play of the plates to and from each other, thus facilitating the engagement of the device with the trip lever.

The bar 16 is connected by a "give and take" connection which will permit the automatic operation of the parts independent of the manually operated devices, with a control lever adjacent to the seat of the operator. In the drawings this compensating connection is shown as a flexible cable or chain 23.

In Fig. 3 is shown an oscillatory shaft 24 mounted in suitable bearings 25 which may be secured on any convenient part of the machine. Carried upon the shaft 24 is an operating lever 26 extending in proximity to the operator's seat 31, and a rock arm 27 to which the opposite end of the cable 23 is attached. Intermediate the connection of the cable 23 with the bar 16 and the rock arm 27 the cable 23 passes over a pulley 28 mounted on any convenient part of the machine, whereby the oscillation of the shaft 24 by means of the lever 26 will cause a pulling strain upon the cable to draw the bar 16 and trip lever 7 in the proper direction to set the mechanism in operation as before described by causing an oscillatory movement of the rock shaft 8.

It is obvious that if the construction of the machine to which the device is applied admits the location of the shaft 24 in such relative position that the pull exerted upon the trip lever through the cable 23 will be in proper direction to trip the mechanism the pulley 28 may be omitted.

In Fig. 4 is shown a construction in which the shaft 24 is omitted and the cable 23 carried from the pulley 28 over a second pulley 29 also supported on a convenient portion of the machine, and thence to an operating lever 30 located adjacent to the operator's seat 21. It is obvious that the operation of either the lever 26 or the lever 30 will cause a depression of the trip lever sufficient to set the tying and discharge mechanism in operation. It is equally obvious that interposition of a flexible or compensating connection between the operating lever and the bar 16, such as formed by the cable 23 or an equivalent device will permit the automatic operation of the trip lever independent of the operating lever.

From the above description it will be apparent that there is thus provided a device of the character described, possessing the particular features of advantage before enumerated as desirable, but which obviously is susceptible of modification in its form, proportion, detail construction and arrangement of parts, without departing from the principle involved or sacrificing any of its advantages.

Having thus described my invention I claim;

1. In a harvesting machine, a rock lever projecting into the path of the sheaf of grain and adapted by its depression to cause the operation of the ejector mechanism of the machine, a detachable bar rigidly secured upon the rock lever adjacent to the point thereof engaged by the sheaf to be discharged, but projecting from the opposite side of said lever, said bar being adjustable upon the rock lever to and from the pivotal point thereof, and means attached to said bar and extending adjacent to the station of the operator whereby the rock lever may be manually operated.

2. In a harvesting machine, a rock lever projecting into the path of the sheaf of grain and adapted by its depression to cause the operation of the ejector mechanism of the machine, a pendant bar abutting the under side of the rock lever adjacent to the point thereof engaged by the sheaf, oppositely disposed jaws carried by the pendant bar adapted to engage the opposite edges of the rock lever, means for causing the jaws to grip the rock lever, actuating means for the rock lever attached to the bar and extending adjacent to the station of the operator.

3. In a harvesting machine, a rock lever projecting into the path of the sheaf of grain and adapted by its depression to cause the operation of the ejector mechanism of the harvester, a pendant member positively engaged upon the operating arm of said lever projecting from the under side thereof, a manually operated control lever adjacent to the station of the operator, and a connection from said control lever to the said pendant member including a flexible section, whereby the rock lever may be positively operated by the manual operation of the control lever, the said flexible section permitting the automatic operation of said rock lever independent of the control lever.

CYRUS O. BOLEN.

Witnesses:
 Chas. E. Fouts,
 Jacob Nelson.